US012806837B2

(12) United States Patent
Kunihiro et al.

(10) Patent No.: US 12,806,837 B2
(45) Date of Patent: Nov. 24, 2026

(54) BACKFLOW-PREVENTING-MECHANISM-EQUIPPED SCREW, INJECTION MOLDING APPARATUS INCLUDING THE SAME, AND BACKFLOW PREVENTING RING

(71) Applicant: THE JAPAN STEEL WORKS, LTD., Tokyo (JP)

(72) Inventors: Daisuke Kunihiro, Tokyo (JP); Mitsuhide Umeda, Tokyo (JP); Hideki Chiba, Tokyo (JP); Katsuyuki Araki, Tokyo (JP); Akira Yasue, Tokyo (JP); Hiroshi Koyamatsu, Tokyo (JP)

(73) Assignee: THE JAPAN STEEL WORKS, LTD., Tokyo (JP)

( * ) Notice: Subject to any disclaimer, the term of this patent is extended or adjusted under 35 U.S.C. 154(b) by 109 days.

(21) Appl. No.: 18/847,577

(22) PCT Filed: Sep. 21, 2022

(86) PCT No.: PCT/JP2022/035097
§ 371 (c)(1),
(2) Date: Sep. 16, 2024

(87) PCT Pub. No.: WO2023/188463
PCT Pub. Date: Oct. 5, 2023

(65) Prior Publication Data

US 2025/0205948 A1 Jun. 26, 2025

(30) Foreign Application Priority Data

Mar. 31, 2022 (JP) ................................ 2022-058042

(51) Int. Cl.
*B29C 45/52* (2006.01)

(52) U.S. Cl.
CPC .................................. *B29C 45/52* (2013.01)

(58) Field of Classification Search
CPC ...... B29C 45/52; B29C 2045/52; B29C 48/58
See application file for complete search history.

(56) References Cited

U.S. PATENT DOCUMENTS 3,698,694 A * 10/1972 Zeug ...................... B29C 45/52 366/78
2011/0229597 A1* 9/2011 Brelski .................. B29C 45/52 425/562

FOREIGN PATENT DOCUMENTS

JP S51-54170 A 4/1976
JP S60-187025 U 12/1985
(Continued)

OTHER PUBLICATIONS

International Search Report for International Patent Application No. PCT/JP2022/035097, Oct. 25, 2022.
(Continued)

*Primary Examiner* — Ariella Machness
(74) *Attorney, Agent, or Firm* — Potomac Law Group, PLLC

(57) ABSTRACT

To provide an excellent backflow-preventing-mechanism-equipped screw. A backflow-preventing-mechanism-equipped screw according to one embodiment includes a screw body part, a pusher fixed to a distal end of the screw body part, a screw head provided on a distal end side in a state of spaced apart from the pusher, a coupling shaft configured to couple the pusher and the screw head to each other, and a backflow preventing ring having a cylindrical shape and provided between the pusher and the screw head in such a way as to cover the coupling shaft and to be slidable in an axial direction. A chamfered part at least partially extending in the axial direction is formed on an outer peripheral surface of the backflow preventing ring.

16 Claims, 23 Drawing Sheets

(56) References Cited

FOREIGN PATENT DOCUMENTS

| | | | | | |
|---|---|---|---|---|---|
| JP | S63-66213 | U | | 5/1988 | |
| JP | H0531772 | A | * | 2/1993 | ............. B29C 45/52 |
| JP | H05237888 | A | * | 9/1993 | ............. B29C 45/52 |
| JP | H09-24529 | A | | 1/1997 | |
| JP | H0929795 | A | * | 2/1997 | ............. B29C 45/52 |
| JP | 2016-107558 | A | | 6/2016 | |

OTHER PUBLICATIONS

Office Action issued Jan. 13, 2026, in Japanese Patent Application No. 2022-058042.

Extended European Search Report and European Search Opinion issued Mar. 10, 2026, in European Patent Application No. 22935594.6.

* cited by examiner

BACKFLOW-PREVENTING-MECHANISM-EQUIPPED SCREW, INJECTION MOLDING APPARATUS INCLUDING THE SAME, AND BACKFLOW PREVENTING RING

TECHNICAL FIELD

The present disclosure relates to a backflow-preventing-mechanism-equipped screw, an injection molding apparatus including the same, and a backflow preventing ring.

BACKGROUND ART

There is a known injection molding apparatus including a backflow-preventing-mechanism-equipped screw. Patent Literature 1, for example, discloses a backflow-preventing-mechanism-equipped screw in which a backflow preventing ring is slidably provided between a screw head and a pusher integrally provided with a screw body part.

CITATION LIST

Patent Literature

Japanese Unexamined Patent Application Publication No. 2016-107558

SUMMARY OF INVENTION

The inventors have found various problems in developing a backflow-preventing-mechanism-equipped screw and an injection molding apparatus including the same.

Other problems and novel features will be apparent from the description herein and attached drawings.

A backflow-preventing-mechanism-equipped screw according to one embodiment includes:

- a screw body part;
- a pusher fixed to a distal end of the screw body part;
- a screw head provided on a distal end side in a state of being spaced apart from the pusher;
- a coupling shaft configured to couple the pusher and the screw head to each other; and
- a backflow preventing ring having a cylindrical shape and provided between the pusher and the screw head in such a way as to cover the coupling shaft and to be slidable in an axial direction,
- in which one or more chamfered part at least partially extending in the axial direction is formed on an outer peripheral surface of the backflow preventing ring.

An injection molding apparatus according to one embodiment is an injection molding apparatus including:

- an injection machine configured to inject a molten resin by a backflow-preventing-mechanism-equipped screw accommodated in a cylinder; and
- a mold configured to mold the molten resin injected from the injection machine, in which
- the backflow-preventing-mechanism-equipped screw includes
  - a screw body part,
  - a pusher fixed to a distal end of the screw body part,
  - a screw head provided on a distal end side in a state of being spaced apart from the pusher,
  - a coupling shaft configured to couple the pusher and the screw head to each other, and
  - a backflow preventing ring having a cylindrical shape and provided between the pusher and the screw head in such a way as to cover the coupling shaft and to be slidable in an axial direction, and
- a chamfered part at least partially extending in the axial direction is formed on an outer peripheral surface of the backflow preventing ring.

A backflow preventing ring according to one embodiment is a backflow preventing ring that is to be mounted on a screw of an injection molding apparatus and that has a cylindrical shape,

- in which one or more chamfered part at least partially extending in an axial direction is formed on an outer peripheral surface of the backflow preventing ring.

According to one embodiment, it is possible to provide an excellent backflow-preventing-mechanism-equipped screw.

DESCRIPTION OF EMBODIMENTS

Hereinafter, specific embodiments will be described in detail with reference to drawings. However, the present disclosure is not limited to the following embodiments. To clarify the description, the following description and drawings are simplified when appropriate.

First Embodiment

<Overall Configuration of Injection Molding Apparatus>

Figure 1:
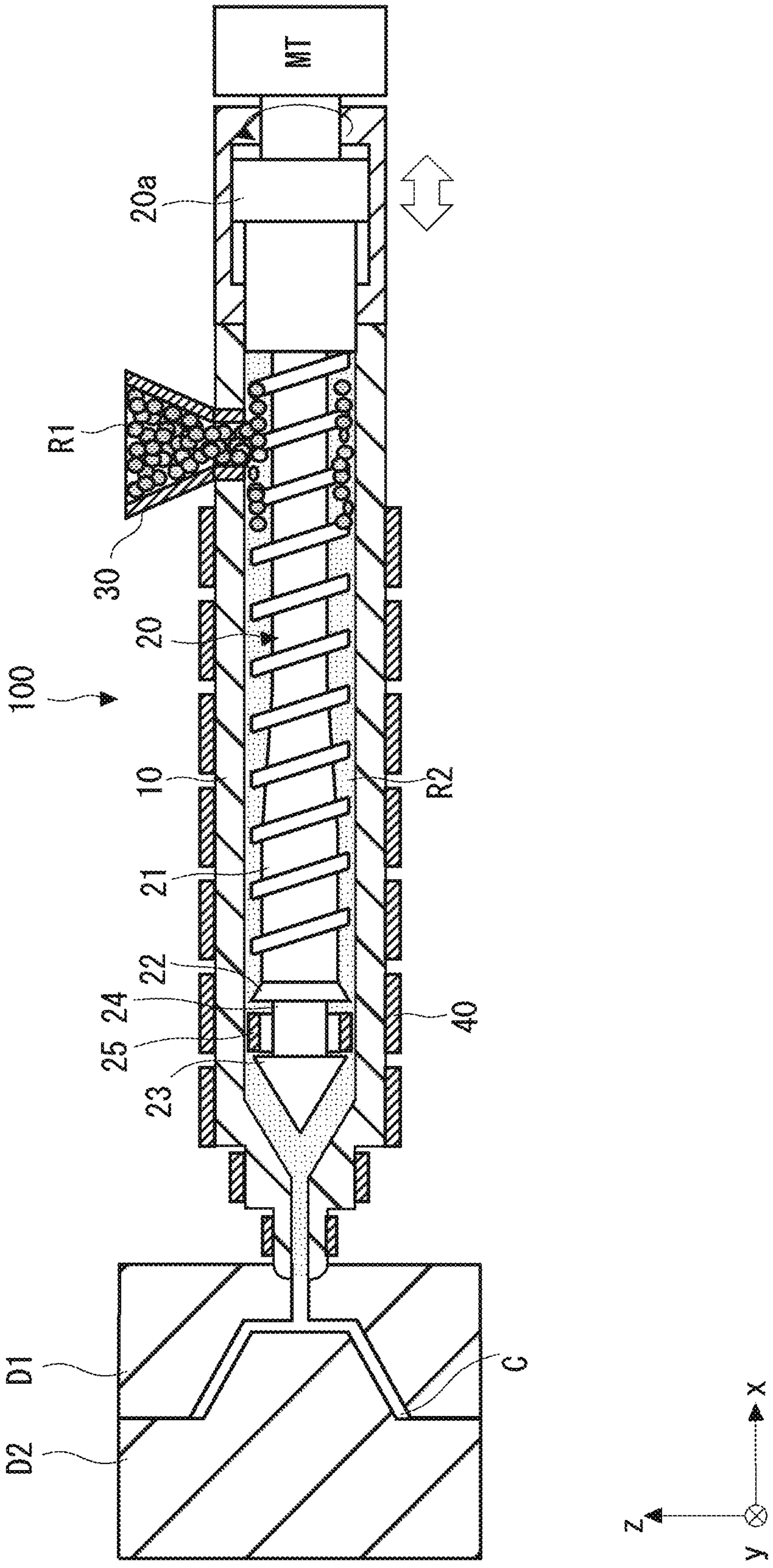
FIG. 1 is a schematic cross-sectional view showing the overall configurations of a backflow-preventing-mechanism-equipped screw and an injection molding apparatus including the same according to a first embodiment.
Figure 2:
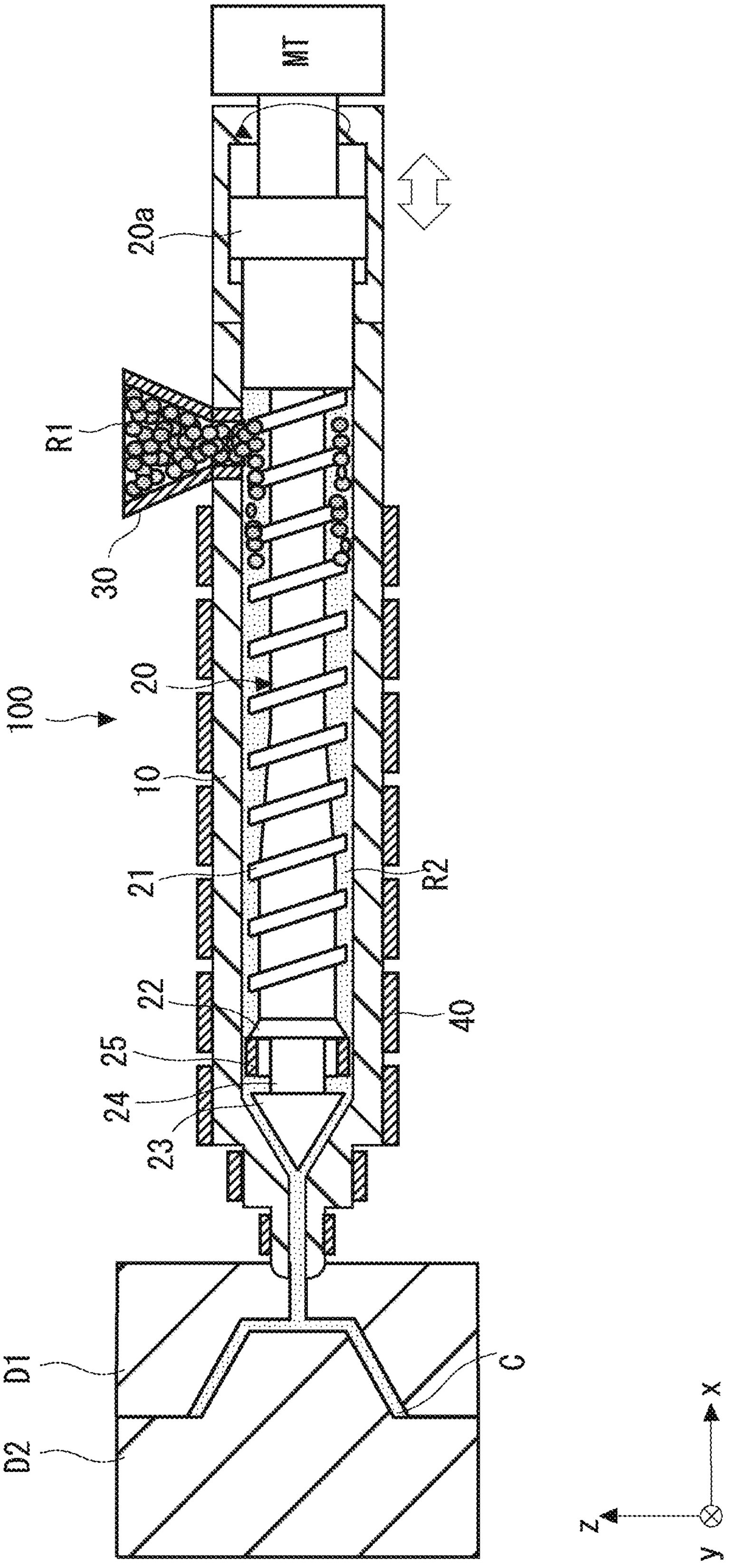
FIG. 2 is a schematic cross-sectional view showing the overall configurations of the backflow-preventing-mechanism-equipped screw and the injection molding apparatus including the same according to the first embodiment.
Figure 3:
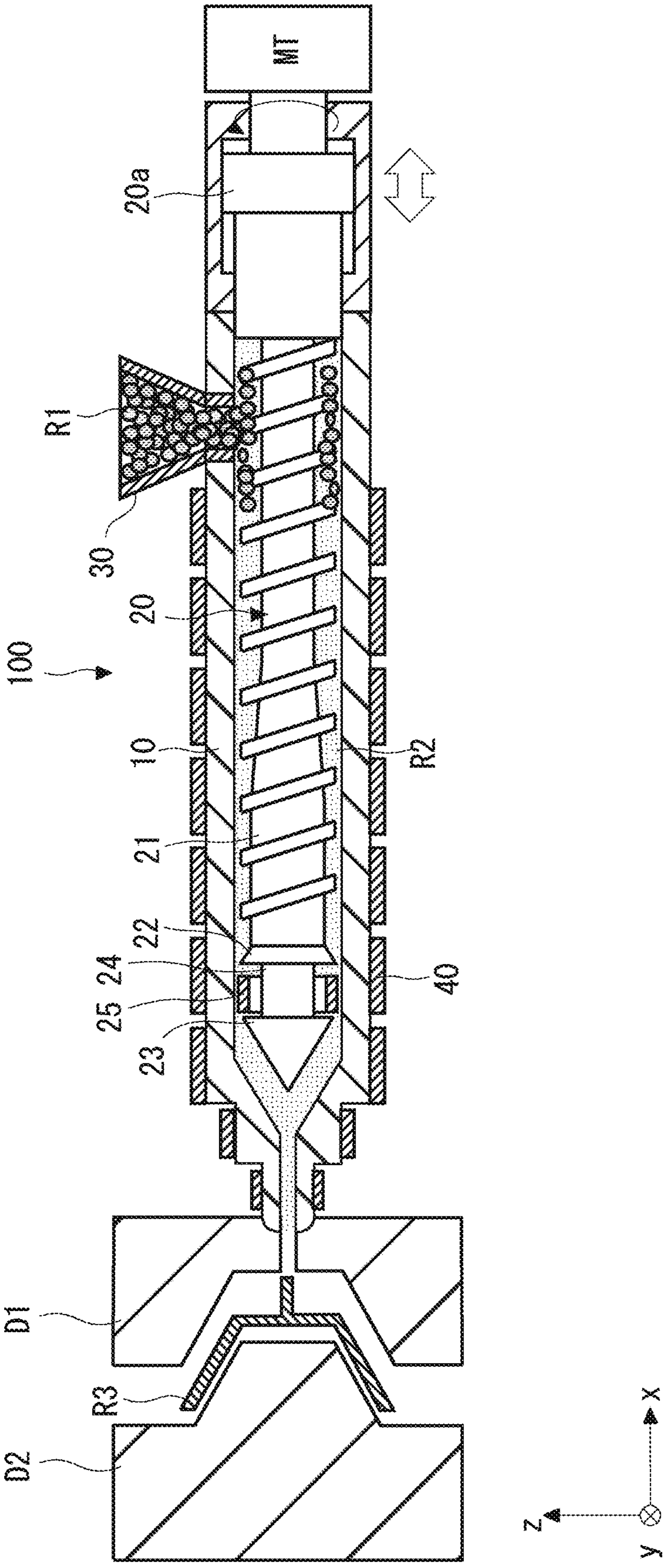
FIG. 3 is a schematic cross-sectional view showing the overall configurations of the backflow-preventing-mechanism-equipped screw and the injection molding apparatus including the same according to the first embodiment.

First, a description will be made, with reference to FIG. 1 to FIG. 3, for the overall configurations of a backflow-preventing-mechanism-equipped screw and an injection molding apparatus including the same according to a first embodiment. FIG. 1 to FIG. 3 are schematic cross-sectional views showing the overall configurations of the backflow-preventing-mechanism-equipped screw and the injection molding apparatus including the same according to the first embodiment.

Right-handed xyz orthogonal coordinates shown in FIG. 1 to FIG. 3 and other drawings described hereinafter are for the sake of convenience in describing the positional relationship between constitutional elements. Generally, the z axis positive direction is the vertical direction, and the xy plane is the horizontal plane, and this is common to the drawings.

The injection molding apparatus can uniformly melt a resin to an appropriate viscosity, can measure a specific amount of molten resin, and can fill the molten resin into a mold. As shown in FIG. 1 to FIG. 3, the injection molding apparatus according to the present embodiment includes an injection machine 100, a fixed mold D1, and a movable mold D2. The injection machine 100 includes a cylinder 10, a screw 20, a hopper 30, and annular heaters 40.

FIG. 1 shows a state of the injection molding apparatus immediately before a molten resin R2 is injected into a cavity C of a mold (the fixed mold D1 and the movable mold D2).

FIG. 2 shows a state of the injection molding apparatus after the completion of the injection of the molten resin R2 into the cavity C of the mold.

FIG. 3 shows a state of the injection molding apparatus in which a resin molded product R3 is taken out from the mold.

As shown in FIG. 1 to FIG. 3, the cylinder 10 of the injection machine 100 is a cylindrical member extending in the X axis direction. The distal end portion (the end portion on the x-axis-negative-direction side) of the cylinder 10 narrows in a stepwise manner, thus forming a nozzle. In the example shown in the drawing, the distal end portion of the cylinder 10 narrows at two stages, and the distal end of the cylinder 10, which has an injection hole, is fitted into a recessed part provided on the fixed mold D1, thus being fixed to the fixed mold D1.

As shown in FIG. 1 to FIG. 3, the screw 20 extends in the X axis direction, and is accommodated in the cylinder 10 in such a way as to be rotatable. That is, the axis of rotation of the screw 20 is parallel to the x axis.

The screw 20 is the backflow-preventing-mechanism-equipped screw according to the present embodiment, and includes a screw body part 21, a pusher 22, a screw head 23, a coupling shaft 24, and a backflow preventing ring 25.

The root part of the screw 20, that is, the root part of the screw body part 21 (the end portion on the x-axis-positive-direction side), is coupled to a motor MT, being a rotation drive source, via a piston 20*a*. The piston 20*a* is movable in the X axis direction by an actuator not shown in the drawing, so that the screw 20 is also movable in the X axis direction. As shown in FIG. 2, when the screw 20 advances in the x axis negative direction, the molten resin R2 is injected into the mold (the fixed mold D1 and the movable mold D2) from the most distal end portion of the cylinder 10. The x axis negative direction is also referred to as "downstream side".

The screw body part 21 is the body part of the screw 20. The screw body part 21 includes a screw shaft and a screw blade, the screw shaft extending in the X axis direction from the root part to the distal end portion of the screw 20, the screw blade being provided on the outer peripheral surface of the screw shaft in a helical shape.

The pusher 22 is a member having a disk shape and fixed to the distal end of the screw body part 21. The diameter of the pusher 22 is larger than the diameter of the screw shaft of the screw body part 21.

The screw head 23 is a member having a conical shape and provided on the distal end side (x-axis-negative-direction side) in a state of being spaced apart from the pusher 22. The center portion of the main surface of the pusher 22 on the distal end side is coupled to the center portion of the bottom surface of the screw head 23 by the coupling shaft 24 coaxial with the screw shaft of the screw body part 21. That is, the screw head 23 rotates together with the screw body part 21, and moves in the X axis direction together with the screw body part 21. As shown in FIG. 1, the molten resin R2 stored at the distal end portion of the cylinder 10 is extruded by the side surface (that is, the front surface) of the screw head 23 having a conical shape as shown in FIG. 2.

The backflow preventing ring 25 is a member having a cylindrical shape and provided between the pusher 22 and the screw head 23 in such a way as to cover the coupling shaft 24 and to be slidable in the axial direction. Although the detail will be described later, the backflow preventing ring 25 is provided to prevent a backflow of the molten resin R2 from the screw head 23 side toward the screw body part 21 side during injection shown in FIG. 2. Therefore, the outer diameter of the backflow preventing ring 25 is substantially equal to the inner diameter of the cylinder 10. In contrast, the inner diameter of the backflow preventing ring 25 is larger than the outer diameter of the coupling shaft 24 to provide a gap that allows the molten resin R2 to pass through the gap.

It is impossible for the gap between the backflow preventing ring 25 and the cylinder 10 to be reduced to zero and hence, it is impossible to completely prevent a backflow of the molten resin R2 through the gap. The gap between the backflow preventing ring 25 and the cylinder 10 is approximately 50 or 60 μm, for example. The detailed configuration of the backflow preventing ring 25 will be described later.

The operation of a backflow preventing mechanism including the backflow preventing ring 25 will be described with reference to FIG. 1 to FIG. 3.

When the screw 20 advances as shown in FIG. 1 and FIG. 2, the molten resin R2 is injected. At this point of operation, the backflow preventing ring 25 comes into contact with the pusher 22 without substantially forming a gap, thus preventing a backflow of the molten resin R2 from the screw head 23 side toward the screw body part 21 side.

Although not particularly limited, the rotation of the screw 20 is stopped at the time of the screw 20 advancing to inject the molten resin R2.

In contrast, when the screw 20 retracts as shown in FIG. 3, the molten resin R2 to be injected is measured, and is stored at the distal end portion of the cylinder 10. At this point of operation, the backflow preventing ring 25 moves toward the screw head 23 side, so that a gap is formed between the backflow preventing ring 25 and the pusher 22. Therefore, the molten resin R2 flows toward the screw head 23 side from the screw body part 21 side through the gap formed between the backflow preventing ring 25 and the coupling shaft 24 and the gap formed between the backflow preventing ring 25 and the screw head 23.

The hopper 30 is a cylindrical member provided to charge resin pellets R1, being the raw material for the molten resin R2 shown in FIG. 1 to FIG. 3, into the cylinder 10. The hopper 30 is provided on the upper side of the cylinder 10 at the end portion on the x-axis-positive-direction side. The x-axis-positive-direction side is also referred to as "upstream side".

The annular heaters 40 are provided in a line along the axial direction of the cylinder 10 (X axis direction) in such a way as to cover the outer peripheral surface of the cylinder 10. In the example shown in FIG. 1 to FIG. 3, nine annular heaters 40 are provided at positions closer to the distal end side (x-axis-negative-direction side) than the hopper 30. Each of the plurality of annular heaters 40 is individually controlled by a control unit not shown in the drawing, for example.

The number of annular heaters 40 and an installation area are not particularly limited, and are suitably determined.

In the injection machine 100 according to the first embodiment, the granular resin pellet R1 supplied from the hopper 30 is stirred by the rotating screw 20 in the cylinder 10 while being heated by the annular heaters 40. A temperature at which the resin pellet R1 is heated by the annular heaters 40 is approximately 200 to 300° C., for example. When the resin pellet R1 is heated and extruded from the root part toward the distal end portion of the screw 20 (in the x axis negative direction), the resin pellet R1 is compressed to change to a molten resin R2.

The fixed mold D1 is a mold fixed to the distal end of the injection machine 100. In contrast, the movable mold D2 is a mold that is driven by a drive source not shown in the drawing, and is slidably movable in the X axis direction. When the movable mold D2 moves in the x axis positive direction, and comes into contact with the fixed mold D1, as shown in FIG. 1, the cavity C having a shape of the resin molded product R3 to be manufactured is formed between the fixed mold D1 and the movable mold D2 (see FIG. 3).

Next, as shown in FIG. 2, the screw 20 is caused to advance in the x axis negative direction to fill the molten resin R2 into the mold (the fixed mold D1 and the movable mold D2), that is, into the cavity C. When the molten resin R2 is cooled and is cured by the mold (the fixed mold D1 and the movable mold D2), the resin molded product R3 is molded. The temperature of the mold (the fixed mold D1 and the movable mold D2) is approximately 40 to 100° C., for example.

Then, as shown in FIG. 3, when the screw 20 retracts in the x axis positive direction, and the movable mold D2 moves in the x axis negative direction to be released from the fixed mold D1, the resin molded product R3 is taken out.

Figure 4:
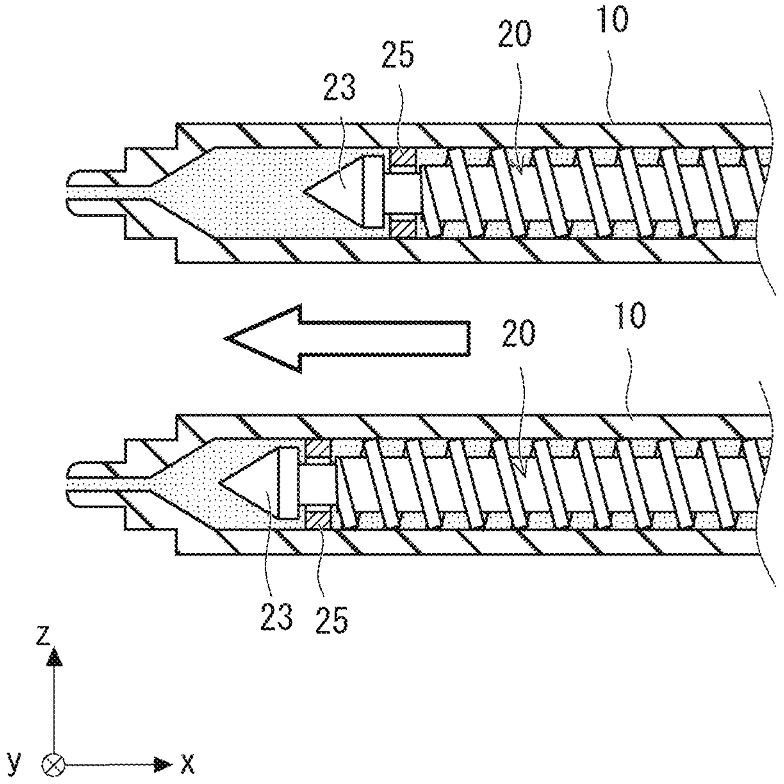
FIG. 4 is a diagram illustrating the movement of the screw during injection.

FIG. 4 is a diagram illustrating the movement of the screw during injection.

During injection in which a molten resin is injected under pressure into the mold, as shown by an arrow, the screw 20 advances in the cylinder 10 toward the downstream side.

Figure 5:
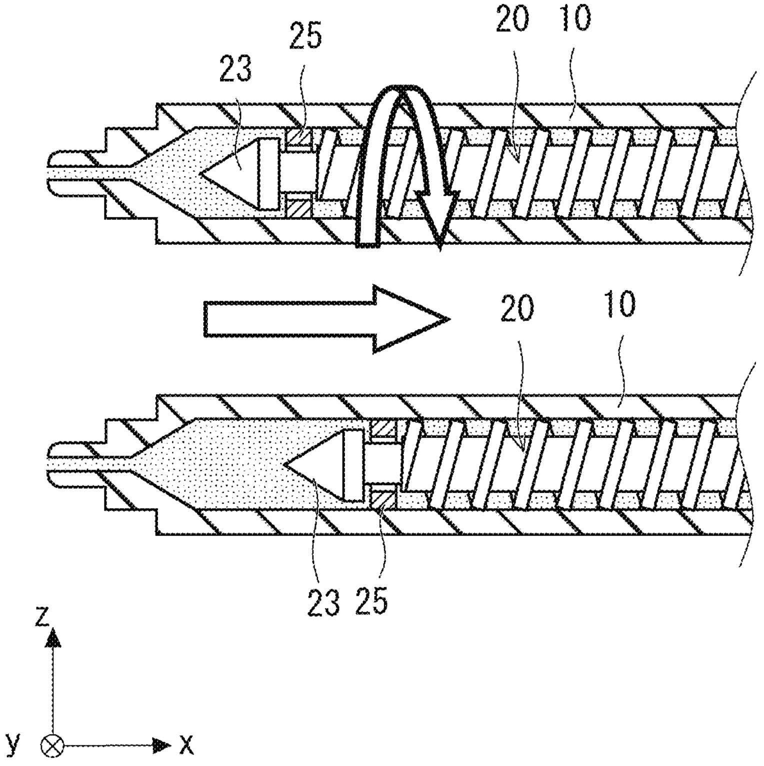
FIG. 5 is a diagram illustrating the movement of the screw during measurement of plasticization.

FIG. 5 is a diagram illustrating the movement of the screw during measurement of plasticization.

During measurement of plasticization in which a molten resin is kneaded and melted, the screw 20 retracts in the cylinder 10 toward the upstream side. For the sake of simplification, a pusher is not illustrated in FIG. 4 and FIG. 5.

As described above, the injection molding apparatus can uniformly melt a resin to an appropriate viscosity, can measure a specific amount of molten resin, and can fill a molten resin into the mold.

Figure 6:
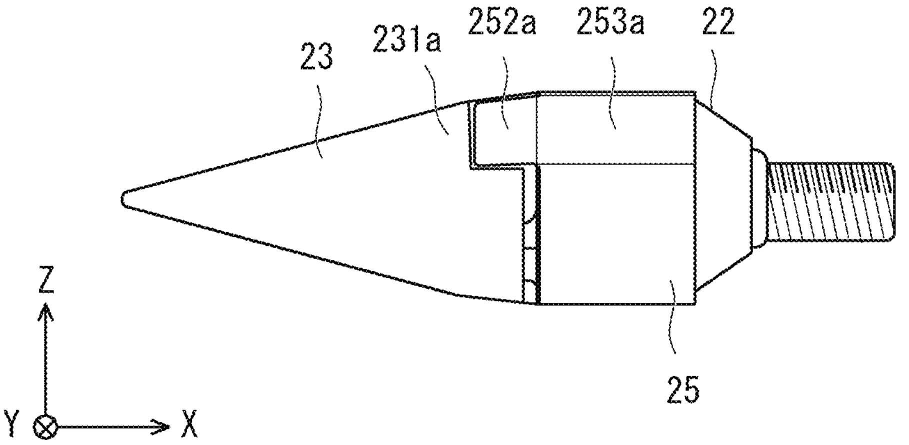
FIG. 6 is a diagram showing a screw head and a backflow preventing ring.

FIG. 6 is a diagram showing the screw head and the backflow preventing ring.

The screw head 23 having a conical shape includes a recessed part 231*a* on the backflow preventing ring 25 side. Meanwhile, the backflow preventing ring 25 includes a claw part 252*a* that is fitted into the recessed part 231*a* of the screw head 23. Consequently, rotation of the screw head 23 can cause corotation of the backflow preventing ring 25. The backflow preventing ring 25 is in contact with the pusher 22 provided on the screw body part side.

Next, the function of the backflow preventing ring during injection and during measurement of plasticization will be described with reference to FIG. 7 and FIG. 8.

Figure 7:
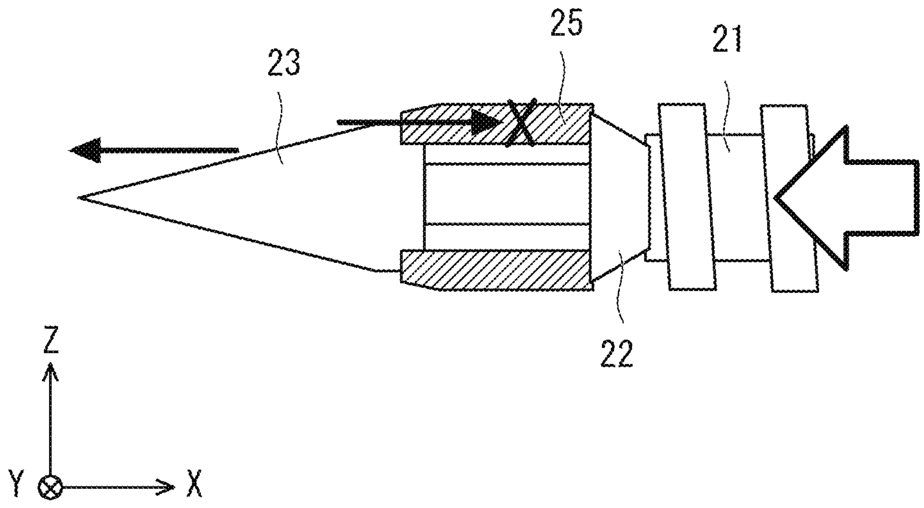
FIG. 7 is a cross-sectional view showing the relationship between the screw head and the backflow preventing ring during injection.

FIG. 7 is a cross-sectional view showing the relationship between the screw head and the backflow preventing ring during the injection.

Figure 8:
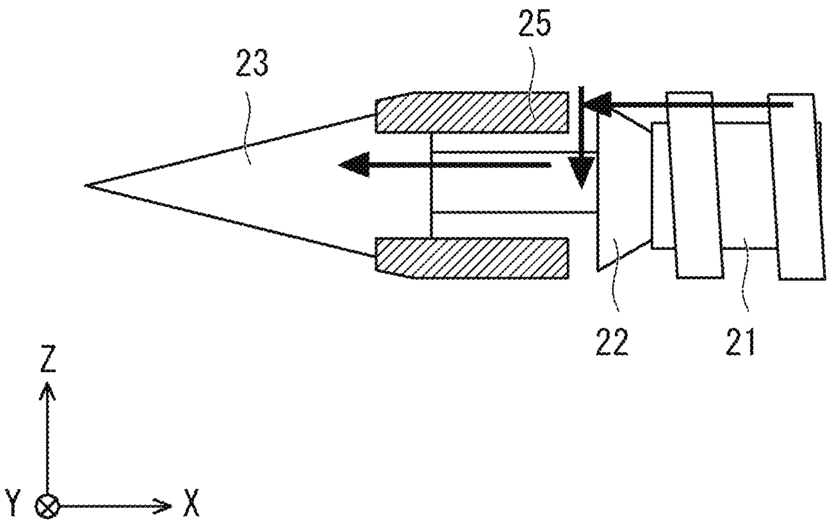
FIG. 8 is a cross-sectional view showing the relationship between the screw head and the backflow preventing ring during (measurement of) plasticization.

Arrows shown in FIG. 7 and FIG. 8 show the flow directions of a resin. During injection, volume shrinkage of the resin is caused in the mold to form a solid resin. To perform replenishment by an amount corresponding to the volume shrinkage, it is necessary to further inject molten resin. A pressure necessary to perform replenishment of a molten resin in such a case is referred to as "holding pressure". In FIG. 7, the backflow preventing ring 25 moves toward the upstream side due to a pressure caused by injection, and then comes into contact with the pusher 22. Consequently, it is possible to maintain a necessary holding pressure by preventing a backflow of a resin on the downstream side toward the upstream side.

FIG. 8 is a cross-sectional view showing the relationship between the screw head and the backflow preventing ring during measurement of plasticization.

In FIG. 8, due to the pressure of a resin flowing from the upstream side toward the downstream side, the backflow preventing ring 25 moves toward the downstream side (that is, toward the screw head 23 side). A gap is formed between the pusher 22 and the backflow preventing ring 25, so that the resin flows into the screw head through this gap. The resin flowing into the screw head is injected into the mold disposed on the downstream side.

As described above, the backflow preventing ring 25 prevents a backflow of a resin on the downstream side toward the upstream side during injection. Hereinafter, the detailed configuration of a normal backflow preventing ring according to a comparison example and problems of the normal backflow preventing ring will be described.

<Detailed Configuration of Backflow Preventing Ring 250 According to Comparison Example>

Figure 9:
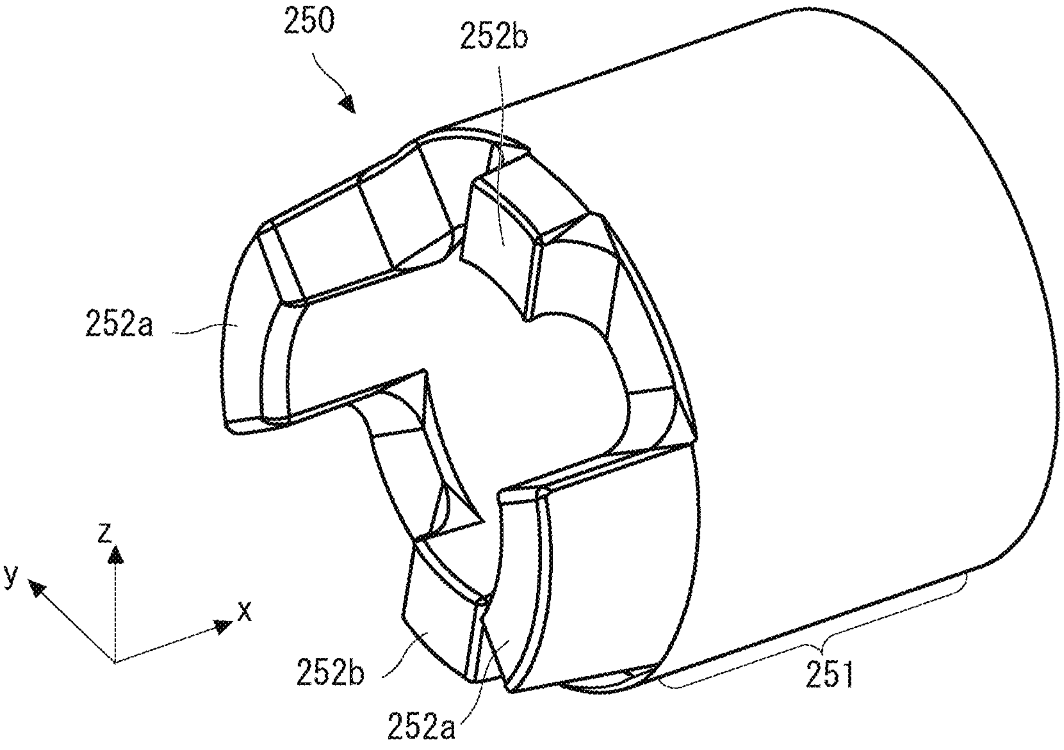
FIG. 9 is a perspective view showing the detailed configuration of a backflow preventing ring 250 according to a comparison example.

The detailed configuration of a backflow preventing ring 250 according to the comparison example will be described with reference to FIG. 9. FIG. 9 is a perspective view showing the detailed configuration of the backflow preventing ring 250 according to the comparison example.

As shown in FIG. 9, the backflow preventing ring 250 according to the comparison example includes a ring body part 251 and claw parts 252*a*, 252*b*.

The ring body part 251 is the body part of the backflow preventing ring 250, and is a part having a cylindrical shape.

The claw parts 252*a*, 252*b* are integrally provided with the ring body part 251 in a state of protruding from the end surface of the ring body part 251 on the screw head 23 side (x-axis-negative-direction side) toward the screw head 23. In other words, each recessed part (notch) is provided between the claw part 252*a* and the claw part 252*b* that are disposed adjacent to each other. The claw parts 252*a*, 252*b* are fitted into recessed parts (231*a* in FIG. 6) formed on a screw head 23, so that the backflow preventing ring 250 can be corotated with the screw head 23. The large claw parts 252*a* and the small claw parts 252*b* are alternately provided in a state of being spaced apart from each other.

In the example shown in FIG. 9, a pair of claw parts 252*a* are axially-symmetrically provided in such a way as to face each other. A pair of claw parts 252*b* are axially-symmetrically provided at a center portion between the pair of claw parts 252*a* in such a way as to face each other.

The height of the claw parts 252*a* (the length in the direction of the axis of rotation) is larger than the height of the claw parts 252*b*, and the width of the claw parts 252*a* (the length in the circumferential direction) is larger than the width of the claw parts 252*b*.

The inner peripheral surfaces of the claw parts 252*a*, 252*b* are flush with the inner peripheral surface of the ring body part 251. In contrast, the outer peripheral surfaces of the claw parts 252*a*, 252*b* are inclined toward the axis of rotation as progressing toward the screw head 23 side.

Figure 10:
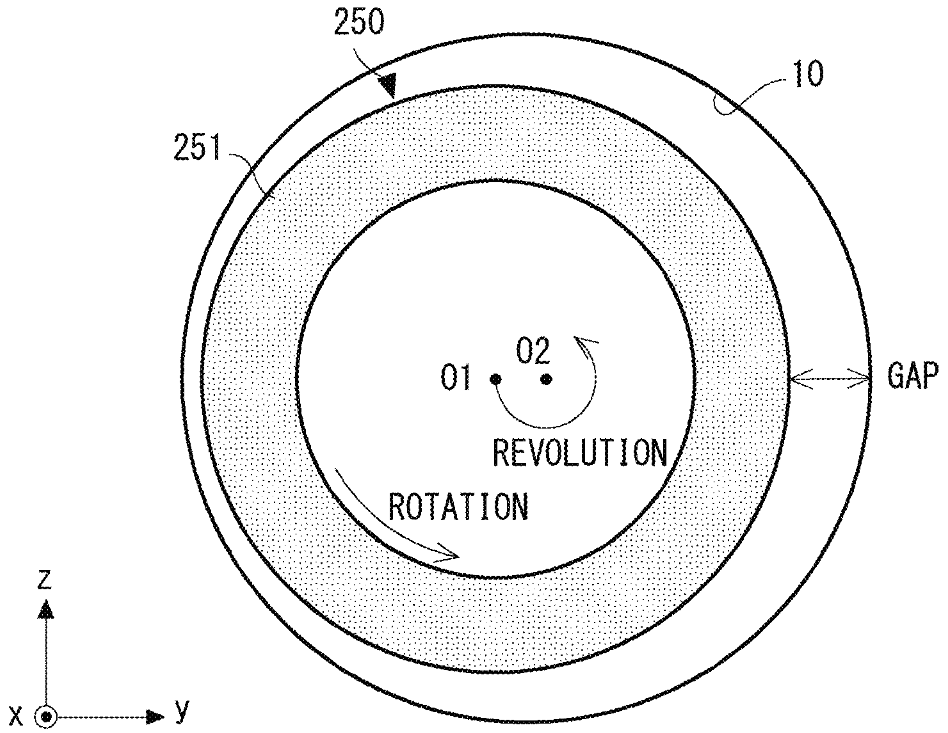
FIG. 10 is a schematic cross-sectional view showing the relationship between the backflow preventing ring 250 and a cylinder 10.

FIG. 10 is a schematic cross-sectional view showing the relationship between the backflow preventing ring 250 and the cylinder 10. As described above, although the outer diameter of the backflow preventing ring 250 is substantially equal to the inner diameter of the cylinder 10, in FIG. 10, a gap formed between the backflow preventing ring 250 and the cylinder 10 is drawn in an exaggerated manner.

As shown in FIG. 10, in the cylinder 10, the backflow preventing ring 250 rotates by using a center axis θ1 of the backflow preventing ring 250 as the axis of rotation, and revolves by using a center axis θ2 of the cylinder 10 as the axis of rotation. Such a revolving motion of the backflow preventing ring 250 is referred to as whirling.

A rotating speed ω1 of the backflow preventing ring 250 is equal to the rotational speed of the screw 20. The inventors investigated a revolving speed ω2 of the backflow preventing ring 250 by measuring a periodic change of a gap formed between the backflow preventing ring 250 and the cylinder 10 as shown in FIG. 10. A displacement measuring method is such that a displacement sensor is inserted into the cylinder 10 to measure the distance between the inner surface of the cylinder (sensor) and the backflow preventing ring.

Figure 11:
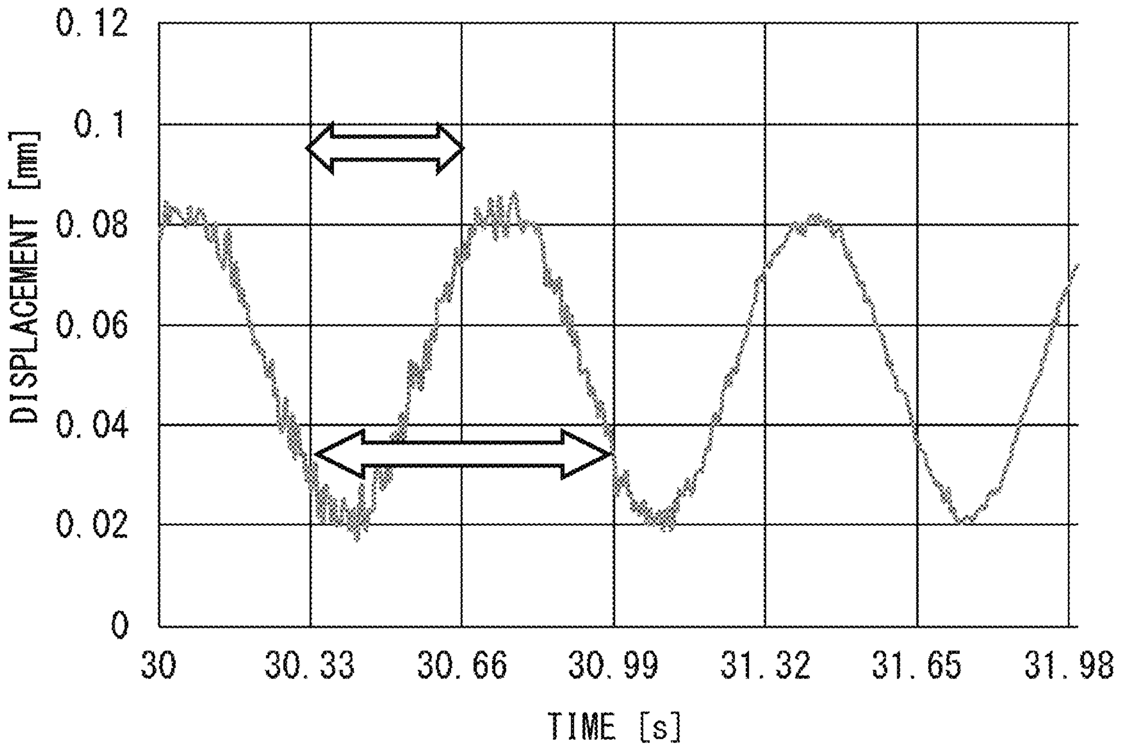
FIG. 11 is a graph showing the measurement result of displacement of the backflow preventing ring during rotation.

FIG. 11 is a graph showing the measurement result of displacement of the backflow preventing ring during rotation. As shown in FIG. 11, a rotational speed of the screw is 182 rpm, 0.33 s/rotation, and a revolving speed of the backflow preventing ring is approximately 91 rpm, 0.66 s/rotation. The backflow preventing ring rotates in a state of being engaged with the claw parts of the screw head, thus rotating at 182 rpm, being equal to the rotational speed of the screw, and revolving with a period (approximately 91 rpm) that is half of the period of the rotation. That is, it was found that the ratio ω2/ω1 of the revolving speed ω2 of the backflow preventing ring 250 to the rotating speed ω1 of the backflow preventing ring 250 is ½ (that is 0.5).

It can be inferred that such a phenomenon in which the ratio ω2/ω1 of the revolving speed ω2 of the backflow preventing ring 250 to the rotating speed ω1 of the backflow preventing ring 250 is ½ is a phenomenon similar to "half-speed whirl" observed in journal bearings. As described above, the backflow preventing ring 250 according to the comparison example has a problem that the ratio ω2/ω1 of the revolving speed ω2 to the rotating speed ω1 is ½, so that galling wear is likely to occur on the cylinder 10 and the backflow preventing ring 250. As a result, there may be cases where metal pieces caused by friction due to galling may be mixed into a molded product, or cases where a sufficient holding pressure cannot be applied due to wear on the outer peripheral surface of ring, so that a defective molded product is produced. In view of the above, to solve these problems, the following configuration of the backflow preventing ring is proposed.

<Detailed Configuration of Backflow Preventing Ring 25 According to First Embodiment>

Figure 12:
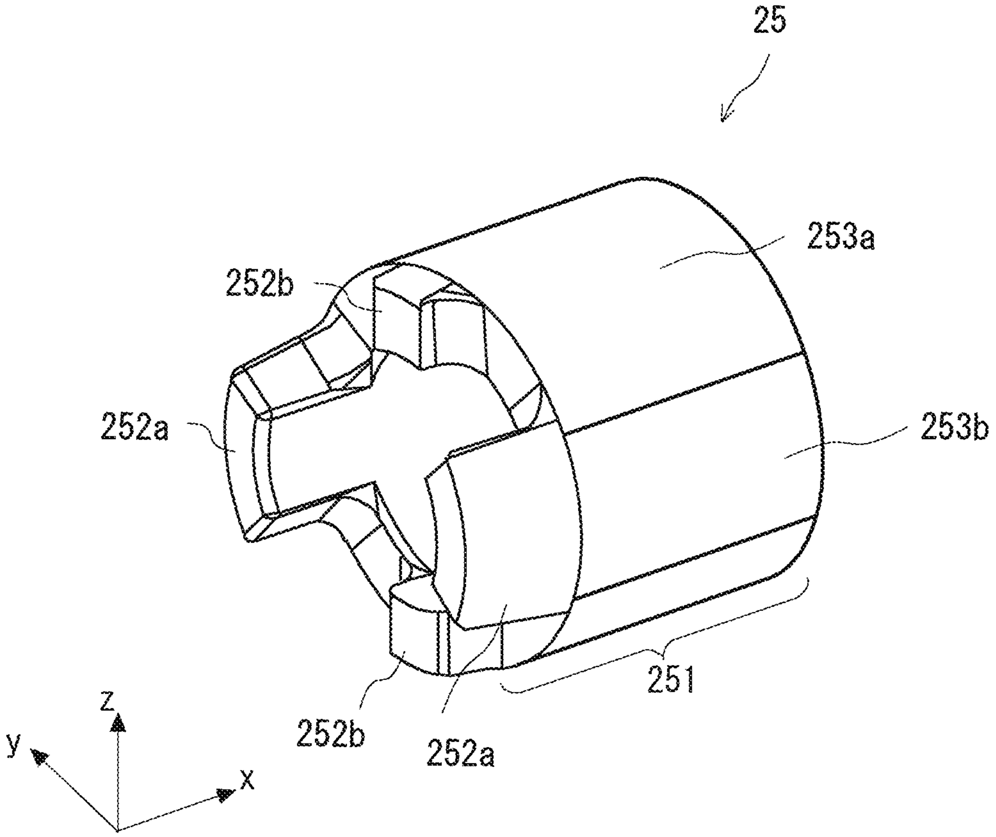
FIG. 12 is a perspective view showing the detailed configuration of the backflow preventing ring 25 according to the first embodiment.

Next, the detailed configuration of the backflow preventing ring 25 according to the first embodiment will be described with reference to FIG. 12. FIG. 12 is a perspective view showing the detailed configuration of the backflow preventing ring 25 according to the first embodiment.

As shown in FIG. 12, the backflow preventing ring 25 according to the present embodiment includes chamfered parts 253*b* in addition to the ring body part 251, the large claw parts 252*a*, and the small claw parts 252*b* shown in FIG. 9.

Configurations of the ring body part 251 and the claw parts 252*a*, 252*b* are substantially equal to those of the backflow preventing ring 250 according to the comparison example shown in FIG. 9 and hence, the description of such components will be omitted.

As shown in FIG. 12, the chamfered part 253*b* is a surface on the outer peripheral surface of the ring body part 251, the surface extending in the axial direction, chamfering being performed on the surface. The chamfered part 253*b* is formed by mechanical processing, for example. The chamfered part is provided to increase a gap between the backflow preventing ring and the inner surface of the cylinder, and can solve the above-described problem of whirling of the backflow preventing ring. It can be considered that a pressure difference is generated between the chamfered parts and portions on which chamfering is not performed, so that whirling is prevented.

In the example shown in FIG. 12, two chamfered parts 253*b* extending across the entire length of the ring body part 251 in the axial direction of the ring body part 251 (X axis direction) are provided at equal intervals in the circumferential direction, that is, are axially-symmetrically provided at 180° intervals. In the example shown in FIG. 12, a pair of chamfered parts 253*b* are axially-symmetrically formed. That is, on the outer peripheral surface of the ring body part 251, the normal outer peripheral parts 253*a* and the chamfered parts 253_b_ are alternately formed so as to form a stripe shape formed by chamfered parts and non-chamfered parts.

The chamfered parts 253_b_ are provided in such a way as to correspond to the positions of the claw parts 252_a_. The length of the chamfered part 253_b_ in the circumferential direction is shorter than the length of the claw part 252_a_ in the circumferential direction. The claw parts 252_a_ are not chamfered, and slightly protrude from the chamfered parts 253_b_. With such a configuration, it is possible to prevent a backflow of a resin by the claw parts 252_a_, and it is also possible to prevent, by the chamfered parts 253_b_ of the backflow preventing ring, friction due to galling that is caused by whirling.

The number of chamfered parts 253_b_ may be suitably determined, and may be one. In the case where a plurality of chamfered parts 253 are provided, intervals between adjacent chamfered parts 253 are not necessarily equal intervals. Provided that the chamfered parts 253 extend in the axial direction of the ring body part 251 (X axis direction), each chamfered part 253 may be formed at a portion of the ring body part 251 in the axial direction. In addition, the chamfered part 253 may have a curved shape, a flat shape, or a groove shape. Further, the chamfered part 253 may extend in a helical shape along the axial direction of the ring body part 251. From the viewpoint of uniformity and the like of pressure and the like, for example, it may be preferable to perform chamfering by performing rounding at equal intervals.

Figure 13:
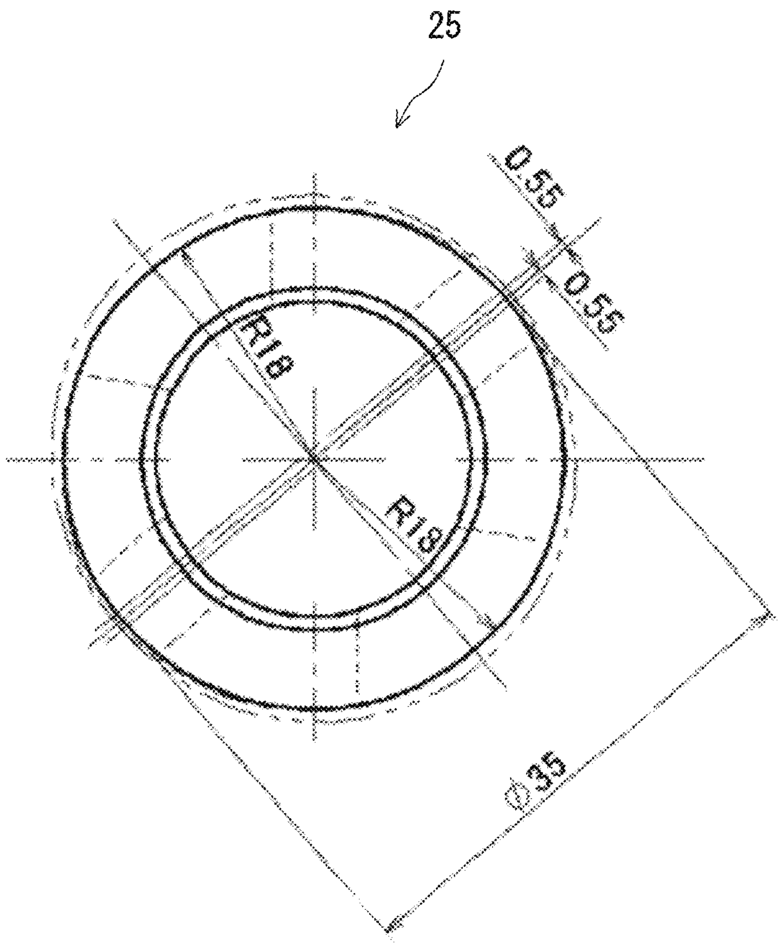
FIG. 13 is a cross-sectional view illustrating a method for rounding the backflow preventing ring 25 according to the first embodiment.
Figure 14:
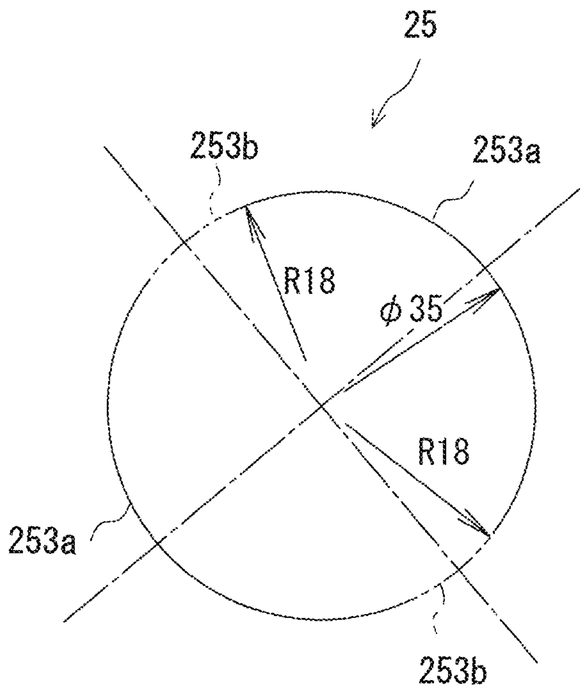
FIG. 14 is a cross-sectional view of the rounded backflow preventing ring 25 according to the first embodiment.
Figure 15:
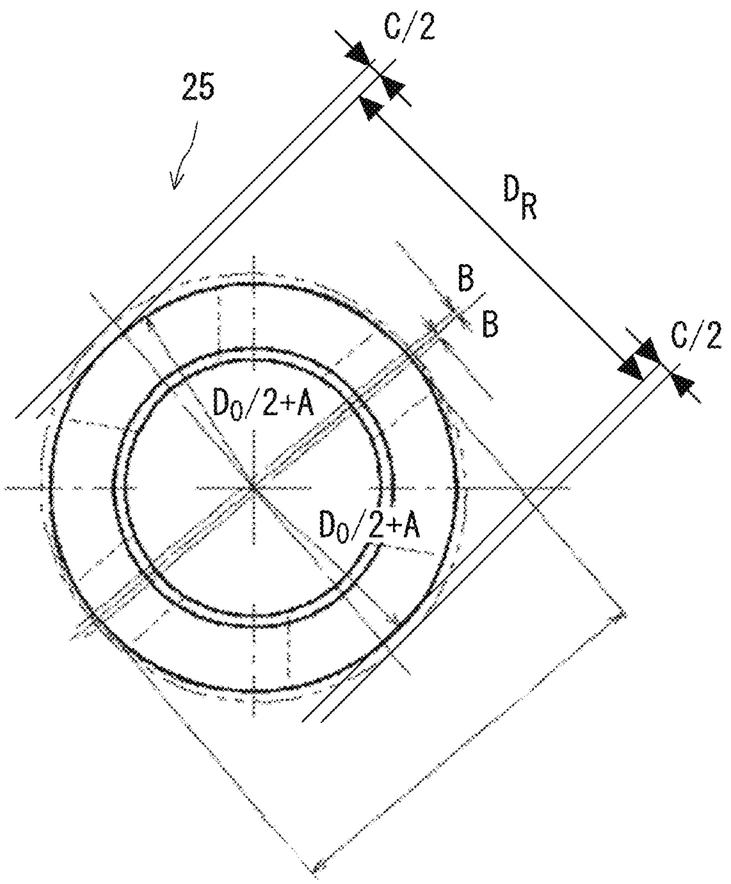
FIG. 15 is a cross-sectional view illustrating the method for rounding the backflow preventing ring 25 according to the first embodiment.

Next, the chamfered parts formed by performing rounding will be described with reference to FIG. 13 to FIG. 15. FIG. 13 is a cross-sectional view illustrating a method for rounding the backflow preventing ring 25 according to the first embodiment. FIG. 14 is a cross-sectional view of the rounded backflow preventing ring 25 according to the first embodiment. FIG. 15 is a cross-sectional view illustrating the method for rounding the backflow preventing ring 25 according to the first embodiment.

FIG. 13 illustrates an example in which rounding is performed on the backflow preventing ring 25 having an annular shape with a diameter of 35 mm. Assume that the chamfered parts are rounded such that the diameter is reduced by 0.1 mm (that is, the diameter after rounding becomes 34.9 mm). Consider a case where rounding with a radius of 18 mm is performed on desired regions on the outer peripheral surface of the backflow preventing ring. Radius 18 mm×2=diameter 36 mm, 36 mm-34.9 mm=1.1 mm, and 1.1 mm/2=0.55 mm and hence, it is sufficient to perform rounding by shifting the center of a circle by 0.55 mm. That is, a position 0.55 mm away from the center of a circle having a diameter of 35 mm, and away from the chamfered part (that is, a surface to be processed), is set as the center of rounding. In the case of forming two chamfered parts at 180° intervals in such a way as to face each other, as shown in FIG. 13, positions away from the desired regions facing each other on the outer peripheral surface are set as the centers of rounding.

FIG. 14 is a cross-sectional view showing an example in which the chamfered parts are rounded by using, as the centers, the positions set in FIG. 13. On the outer peripheral surface of the backflow preventing ring 25, the pair of chamfered parts 253_b_ are axially-symmetrically formed by performing rounding in this manner. That is, the cross-sectional view of the backflow preventing ring shown in FIG. 14 is not a true circle. The values of the diameter and the radius are merely examples, and may be suitably set.

FIG. 15 is a diagram illustrating an example of determining the dimension for rounding. The outer diameter of a standard backflow preventing ring is taken as "$D_0$", and the outer diameter of the rounded backflow preventing ring is taken as "$D_R$". In this case, $D_0-D_R=C$ ($C \leq 0.20$) [mm].

Dimension for rounding=$D_0/2+A$ [mm], the range of "A" is ($0<A<D_0/2$) The axial center of the rounding is shifted in the radial direction from the axial center of the backflow preventing ring by B [mm], and B satisfies ($0<B<D_0$) and ($A<B$).

$2*(B-A)=C$, and the outer diameter $D_R$ of the rounded backflow preventing ring satisfies $D_R=D_0-2*(B-A)$ [mm] ($0<D_R<D_0$).

As described above, the outer diameter dimension of the rounded portion may be suitably determined. In some embodiments, chamfering may be performed such that a cross section has an elliptical shape. However, the above-mentioned embodiment, in which chamfering is performed by shifting the axial center, can obtain a higher effect of preventing whirling and preventing a backflow.

Figure 16:
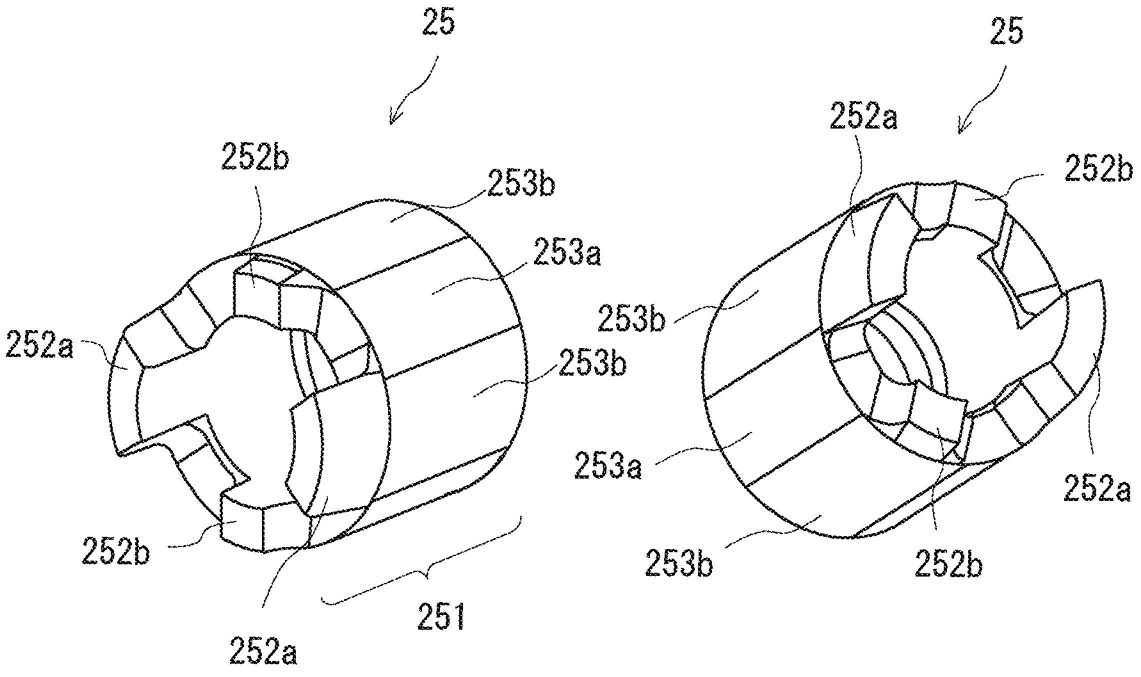
FIG. 16 is a perspective view showing the detailed configuration of a backflow preventing ring according to another embodiment.

FIG. 16 is a perspective view of a backflow preventing ring according to another embodiment.

In the backflow preventing ring 25 shown in FIG. 16, unlike the first embodiment, four chamfered parts 253_b_ are formed across the entire length of a ring body part 251 along the axial direction in a state of being shifted at 90° intervals.

A pair of chamfered parts 253_b_ are provided corresponding to the positions of a pair of large claw parts 252_a_ that face each other. The length of the chamfered part 253_b_ in the circumferential direction is shorter than the length of the large claw part 252_a_ in the circumferential direction.

Meanwhile, a pair of chamfered parts 253_b_ are provided corresponding to the positions of a pair of small claw parts 252_b_ that face each other. The length of the chamfered part 253_b_ in the circumferential direction is larger than the length of the small claw part 252_b_ in the circumferential direction.

The backflow preventing ring according to the present embodiment can also prevent a backflow of a resin and prevent friction due to galling that is caused by whirling of the backflow preventing ring.

Figure 17:
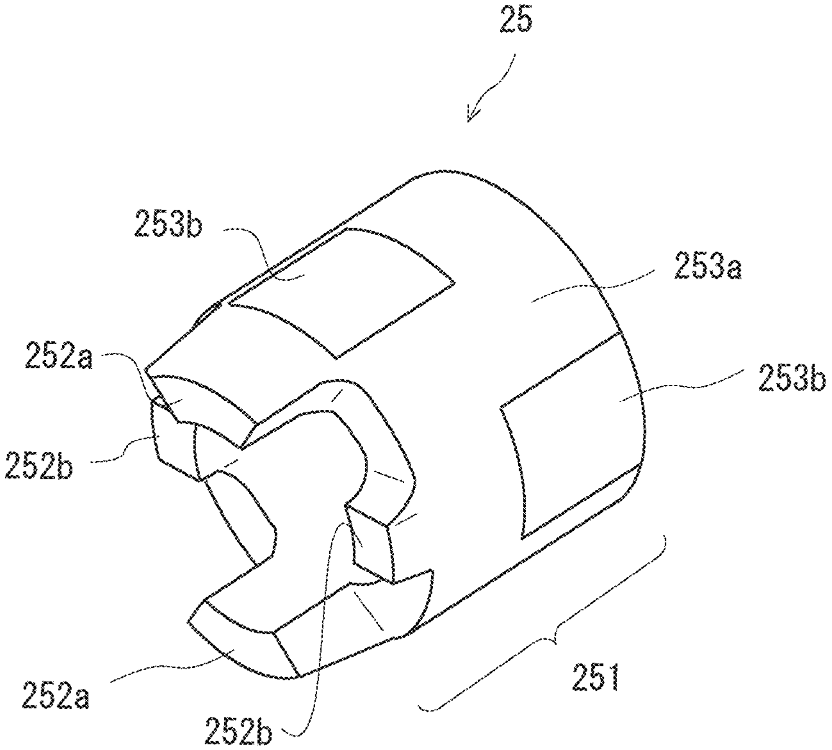
FIG. 17 is a perspective view showing the detailed configuration of a backflow preventing ring according to still another embodiment.

FIG. 17 is a perspective view of a backflow preventing ring according to still another embodiment.

In the backflow preventing ring 25 shown in FIG. 17, unlike the example shown in FIG. 16, four chamfered parts 253_b_ are partially formed along the axial direction in a state of being shifted at 90° intervals. That is, the chamfered parts 253_b_ corresponding to the large claw parts 252_a_ are formed only on the claw part 252_a_ side of a ring body part 251. The chamfered parts 253_b_ corresponding to the small claw parts 252_b_ are formed only on the opposite side of the claw parts 252_a_ of the ring body part 251.

Each first chamfered part 253_b_ is partially provided in such a way as to extend from the end portion of the ring body part 251 of the backflow preventing ring 25 on the screw head side to the center portion of the backflow preventing ring 25 in the axial direction. Each second chamfered part 253_b_ is partially provided in such a way as to extend from the end portion of the ring body part 251 of the backflow preventing ring 25 on the screw body part side to the center portion of the backflow preventing ring 25 in the axial direction. The first chamfered part and the second chamfered part are alternately provided in the circumferential direction of the backflow preventing ring 25.

Figure 18:
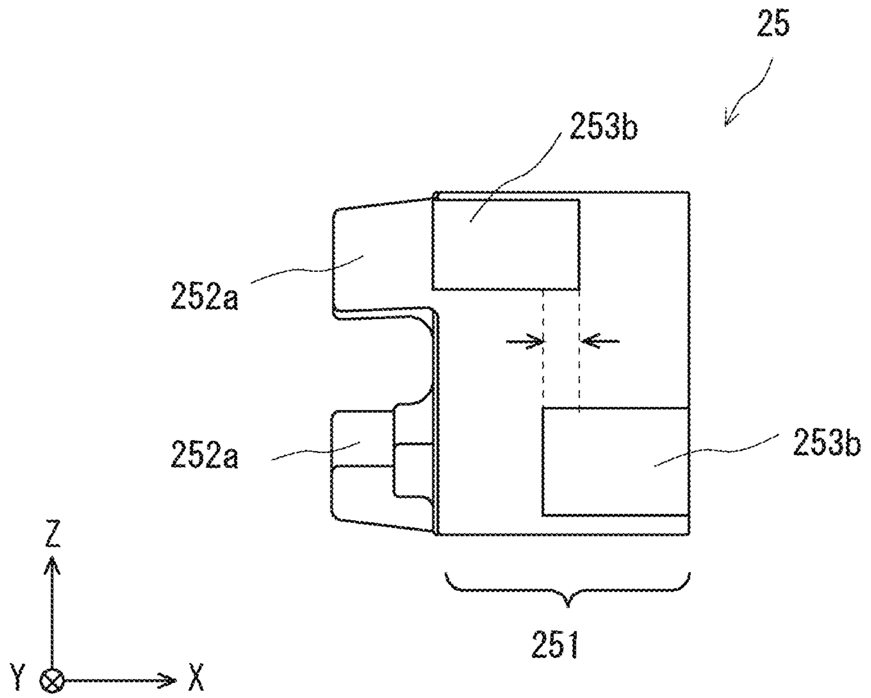
FIG. 18 is a side view illustrating chamfered parts partially formed and shown in FIG. 17.

FIG. 18 is a side view illustrating the chamfered parts partially formed and shown in FIG. 17.

As shown in FIG. 18, the chamfered parts 253_b_ corresponding to the large claw parts 252_a_ and the chamfered parts 253_b_ corresponding to the small claw parts 252_b_ are formed in such a way as to be spaced apart from each other, and to be partially nested in the circumferential direction. With such a configuration, a pressure difference and a repulsive force are generated around the backflow preventing ring, thus suppressing whirling and hence, it is possible to suppress contact between the backflow preventing ring 25 and the inner surface of the cylinder.

Figure 19:
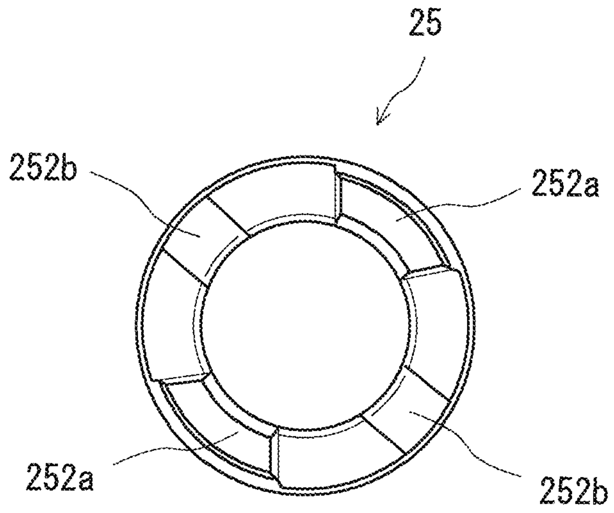
FIG. 19 is a front view of the backflow preventing ring as viewed from the screw head side in the axial direction of the backflow preventing ring.

FIG. 19 is a front view of the backflow preventing ring as viewed from the screw head side in the axial direction of the backflow preventing ring.

In the backflow preventing ring 25, the pair of large claw parts 252*a* are provided in such a way as to face each other with an axis interposed therebetween. The pair of large claw parts 252*b* are also provided in such a way as to face each other with an axis interposed therebetween. The same configuration as FIG. 19 is also applicable to other embodiments.

Figure 20:
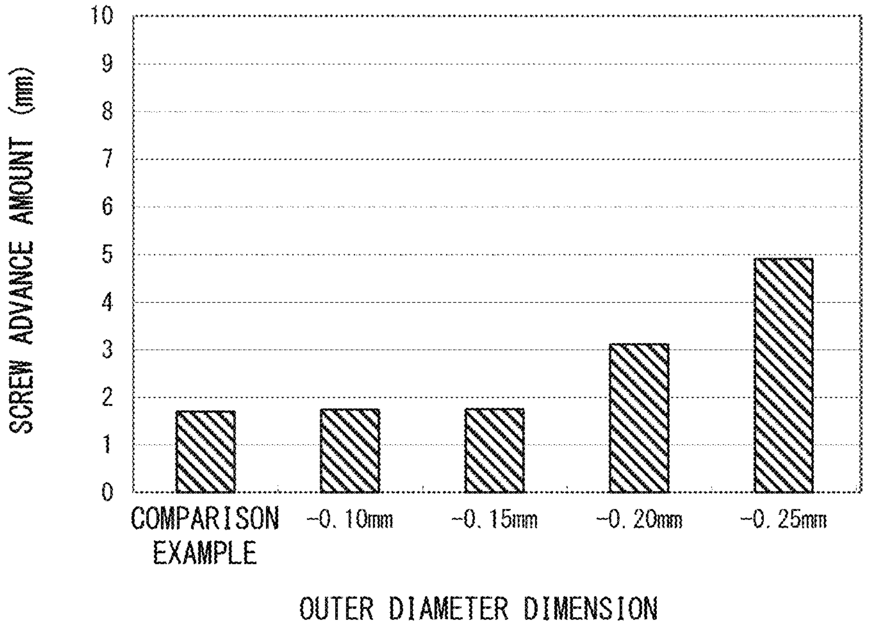
FIG. 20 is a graph showing the advance amount of the screw with respect to the outside dimension of the backflow preventing ring.

FIG. 20 is a graph showing advance amount (mm) of the screw with respect to the outside dimension of a rounded backflow preventing ring. The vertical axis shows advance amount (mm) of the screw at an injection holding pressure.

A standard dimension is a dimension of the backflow preventing ring 250 according to the comparison example shown in FIG. 9. Meanwhile, the values of the outside dimension of the rounded backflow preventing ring shown on the horizontal axis are values of examples in each of which the entire outer peripheral surface of a backflow preventing ring having the standard dimension is chamfered by the same amount (for example, 0.10 mm).

In FIG. 20, each value is obtained by pushing the screw at the same pressure. It can be understood that the advance amount of the screw increases as the outer diameter of the backflow preventing ring is gradually reduced by chamfering with respect to the outer diameter of the backflow preventing ring having the standard dimension. That is, it can be shown that the amount of backflow at a holding pressure increases according to the amount of chamfering. Particularly, in the case where the diameter is reduced to a value smaller than the standard diameter by more than 0.2 mm, the amount of backflow noticeably increases. That is, a backflow preventing function becomes insufficiently exerted. The amount of backflow changes depending on the standard outer diameter dimension, the viscosity of the material, and the holding pressure. In view of the above, it is desirable, from the viewpoint of preventing whirling and a backflow, to chamfer the outer peripheral surface of the backflow preventing ring by 0.10 mm or less. It is also desirable to perform rounding such that the diameter is reduced by 0.20 mm or less. In the case where the pair of chamfered parts are provided in such a way as to face each other as in the case of the above-mentioned embodiments, it is desirable that the total depth of chamfering for both chamfered parts be set to a maximum of 0.2 mm or less.

The above-mentioned example shows the case where the entire outer peripheral surface of the backflow preventing ring having the standard dimension is chamfered by the same amount and hence, the above-mentioned embodiment, in which chamfering is partially performed at equal intervals in the circumferential direction, can obtain a more preferable effect. By setting the length of the chamfered parts 253*b* in the circumferential direction shorter than the length of the claw parts 252*a* in the circumferential direction as shown in FIG. 12, it is possible to obtain a result more preferable than the results shown in FIG. 20. Further, by forming the chamfered parts 253*b* such that the chamfered parts 253*b* are partially formed along the axial direction as shown in FIG. 17, and the adjacent chamfered parts 253*b* are disposed in a staggered manner, thus partially nesting with each other as shown in FIG. 18, it is possible to obtain a more preferable effect. As described above, it is desirable to set the maximum difference between a chamfered surface and an outer peripheral surface on which chamfering is not performed to 0.1 mm or less.

The description will be made, with reference to FIG. 21 to FIG. 23, for whirling preventing effects of the backflow preventing ring according to the embodiment with respect to various kinds of resin.

A comparison was made between the backflow preventing ring according to the comparison example shown in FIG. 9 and the backflow preventing ring according to the embodiment shown in FIG. 12 (that is, the backflow preventing ring including two chamfered parts that are formed by rounding and that face each other). A method of measuring a runout amount and displacement is such that a displacement sensor is inserted into the cylinder 10 to measure the distance between the inner surface of the cylinder (sensor) and the backflow preventing ring. These comparison results show whirling preventing effects with respect to various kinds of resin having a different melt viscosity.

Figure 21:
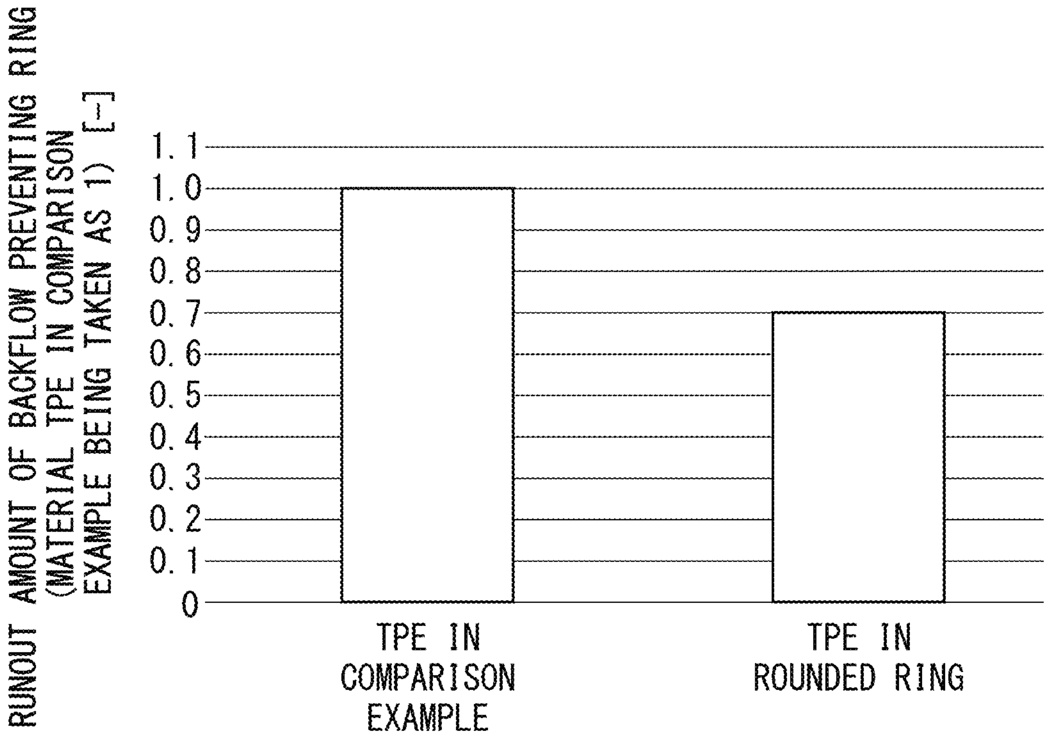
FIG. 21 is a graph showing comparison result of the runout amount for the case of using thermoplastic elastomer as a resin.

FIG. 21 shows the comparison result of the runout amount for the case of using thermoplastic elastomer (TPE) as a resin. When the runout amount of the comparison example is taken as "1", the backflow preventing ring according to the embodiment could reduce the runout amount to approximately 0.3 with respect to the comparison example.

Figure 22:
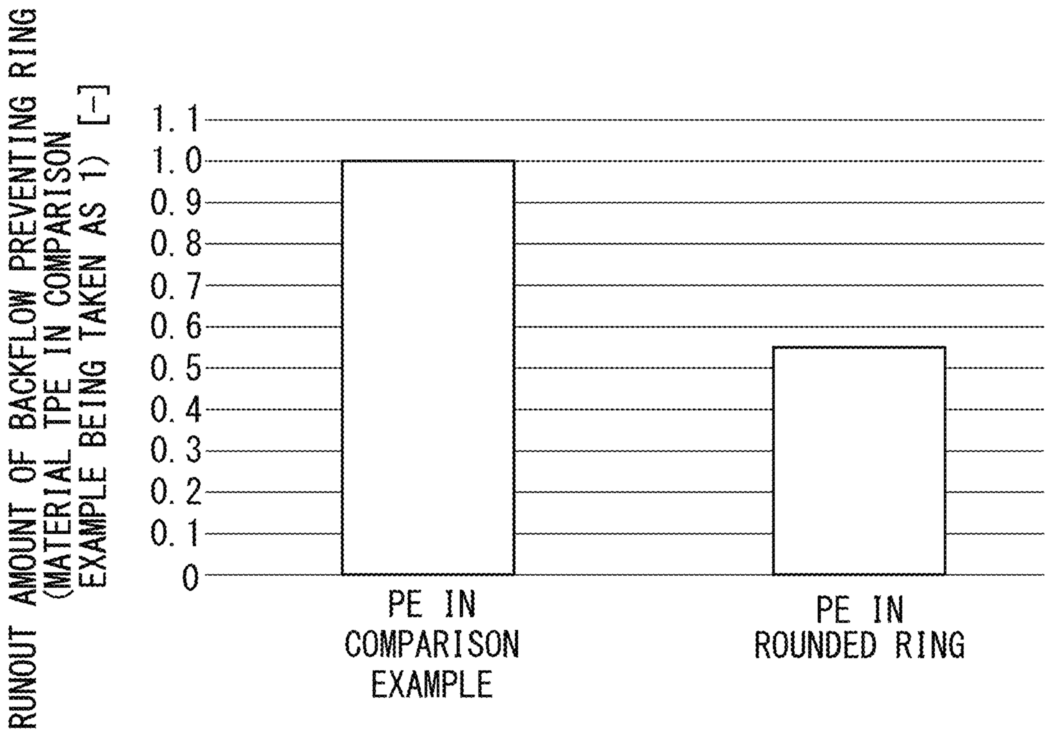
FIG. 22 is a graph showing the comparison result of the runout amount for the case of using polyethylene as a resin.

FIG. 22 shows the comparison result of the runout amount for the case of using polyethylene (PE) as a resin. When the runout amount of the comparison example is taken as "1", the backflow preventing ring according to the embodiment could reduce the runout amount to approximately 0.7 with respect to the comparison example.

Figure 23:
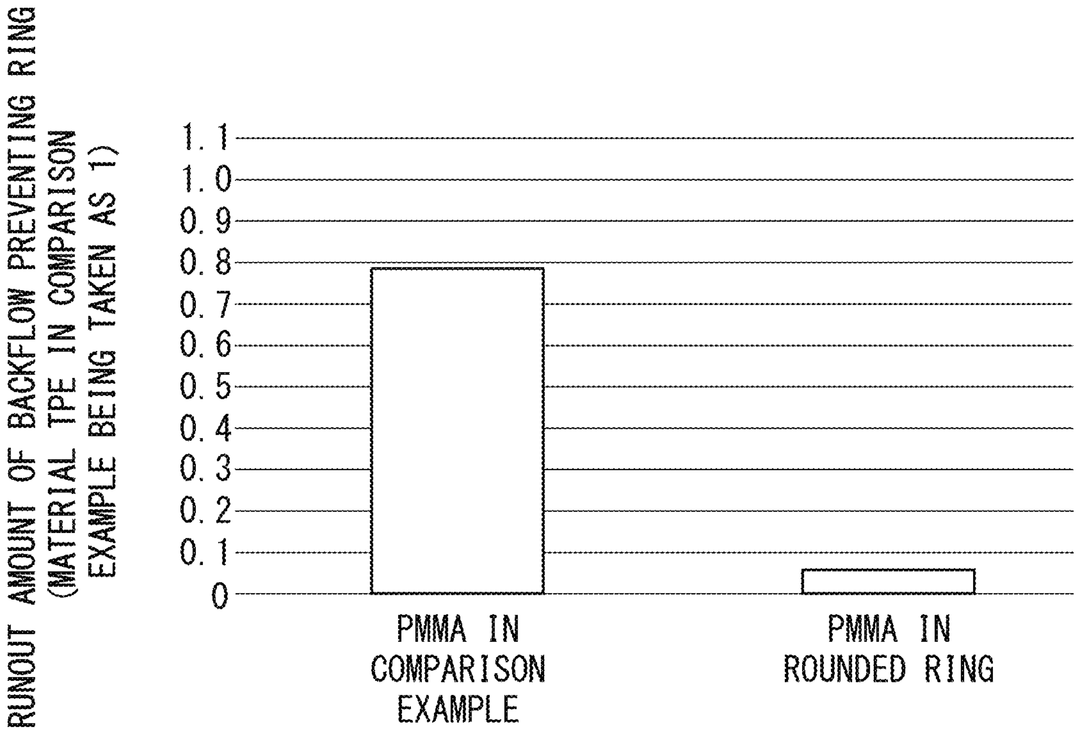
FIG. 23 is a graph showing the comparison result of the runout amount for the case of using an acrylic resin as a resin.

FIG. 23 shows the comparison result of the runout amount for the case of using an acrylic resin (poly methyl methacrylate/PMMA) as a resin. When the runout amount of the comparison example is taken as "1", the backflow preventing ring according to the embodiment could reduce the runout amount to approximately 0.05 with respect to the comparison example.

As described above, according to the backflow preventing ring according to the embodiment, it is possible to reduce the runout amount while a backflow preventing function is maintained. As a result, it is possible to suppress the above-mentioned friction due to galling.

The invention made by the inventors of the present invention has been specifically described heretofore with reference to the embodiments. However, needless to say, the present invention is not limited to the embodiments already described, and various modifications are conceivable without departing from the gist of the present invention. Further, some embodiments may be used in various combinations.

This application claims priority based on Japanese patent application No. 2022-058042 filed on Mar. 31, 2022, and the entire disclosure of which is incorporated herein by reference.

REFERENCE SIGNS LIST

10 CYLINDER
20 SCREW
20*a* PISTON
21 SCREW BODY PART
22 PUSHER
23 SCREW HEAD
24 COUPLING SHAFT
25 BACKFLOW PREVENTING RING

30 HOPPER
40 ANNULAR HEATER
100 INJECTION MACHINE
251 RING BODY PART
252*a*, 252*b* CLAW PART
253, 253*a* OUTER PERIPHERAL PART
253*b* CHAMFERED PART
C CAVITY
D1 FIXED MOLD
D2 MOVABLE MOLD
MT MOTOR
R1 RESIN PELLET
R2 MOLTEN RESIN
R3 RESIN MOLDED PRODUCT

The invention claimed is:

1. A backflow-preventing-mechanism-equipped screw for an injection molding apparatus, the backflow-preventing-mechanism-equipped screw comprising:
a screw body part;
a pusher fixed to a distal end of the screw body part;
a screw head provided on a distal end side in a state of being spaced apart from the pusher;
a coupling shaft configured to couple the pusher and the screw head to each other; and
a backflow preventing ring having a cylindrical shape and provided between the pusher and the screw head in such a way as to cover the coupling shaft and to be slidable in an axial direction,
wherein one or more chamfered part at least partially extending in the axial direction is formed on an outer peripheral surface of the backflow preventing ring, and
wherein in the chamfered part, the outer peripheral surface of the backflow preventing ring is chamfered by 0.10 mm or less.

2. The backflow-preventing-mechanism-equipped screw according to claim 1, wherein the chamfering is performed by rounding.

3. The backflow-preventing-mechanism-equipped screw according to claim 2, wherein the rounding is performed by using, as a center, a position shifted from an axial center of the backflow preventing ring.

4. The backflow-preventing-mechanism-equipped screw according to claim 3, wherein the rounding is performed with a radius different from a radius of the backflow preventing ring by using, as the center, the position shifted from the axial center of the backflow preventing ring.

5. The backflow-preventing-mechanism-equipped screw according to claim 1, wherein
the backflow preventing ring includes
a ring body part, and
a claw part provided in such a way as to protrude from an end surface of the ring body part on a screw head side, the claw part being fitted into a recessed part of the screw head, and
the chamfered part at least partially extends in the axial direction along the claw part.

6. The backflow-preventing-mechanism-equipped screw according to claim 5, wherein a length of the chamfered part in a circumferential direction is shorter than a length of the claw part in the circumferential direction.

7. The backflow-preventing-mechanism-equipped screw according to claim 1,
wherein a plurality of the chamfered parts are provided at an equal interval in the circumferential direction of the backflow preventing ring.

8. The backflow-preventing-mechanism-equipped screw according to claim 1,
wherein the chamfered part is provided across an entire length of a ring body part of the backflow preventing ring in the axial direction of the ring body part.

9. The backflow-preventing-mechanism-equipped screw according to claim 1, wherein
the chamfered part includes
a first chamfered part partially provided in such a way as to extend from an end portion of a ring body part of the backflow preventing ring on a screw head side to a center portion of the ring body part in the axial direction, and
a second chamfered part partially provided in such a way as to extend from an end portion of the ring body part of the backflow preventing ring on a screw body part side to the center portion of the ring body part in the axial direction, and
the first chamfered part and the second chamfered part are alternately provided in the circumferential direction of the backflow preventing ring.

10. The backflow-preventing-mechanism-equipped screw according to claim 9, wherein the first chamfered part and the second chamfered part are provided in such a way as to be separate from each other, and to be partially nested in the circumferential direction.

11. An injection molding apparatus comprising:
an injection machine configured to inject a molten resin by a backflow-preventing-mechanism-equipped screw accommodated in a cylinder; and
a mold configured to mold the molten resin injected from the injection machine, wherein
the backflow-preventing-mechanism-equipped screw includes
a screw body part,
a pusher fixed to a distal end of the screw body part,
a screw head provided on a distal end side in a state of being spaced apart from the pusher,
a coupling shaft configured to couple the pusher and the screw head to each other, and
a backflow preventing ring having a cylindrical shape and provided between the pusher and the screw head in such a way as to cover the coupling shaft and to be slidable in an axial direction, and
a chamfered part at least partially extending in the axial direction is formed on an outer peripheral surface of the backflow preventing ring,
wherein in the chamfered part, the outer peripheral surface of the backflow preventing ring is chamfered by 0.10 mm or less.

12. The injection molding apparatus according to claim 11, wherein the chamfering is performed by rounding.

13. The injection molding apparatus according to claim 11, wherein
the backflow preventing ring includes
a ring body part, and
a claw part provided in such a way as to protrude from an end surface of the ring body part on a screw head side, the claw part being fitted into a recessed part of the screw head, and
the chamfered part at least partially extends in the axial direction along the claw part.

14. A backflow preventing ring that is to be mounted on a screw of an injection molding apparatus and that has a cylindrical shape,
wherein one or more chamfered part at least partially extending in an axial direction is formed on an outer peripheral surface of the backflow preventing ring, and wherein in the chamfered part, the outer peripheral surface of the backflow preventing ring is chamfered by 0.10 mm or less.

15. The backflow preventing ring according to claim 14, wherein the chamfering is performed by rounding.

16. The backflow preventing ring according to claim 14, comprising:

a ring body part; and a claw part provided in such a way as to protrude from an end surface of the ring body part, the claw part being fitted into a recessed part of the screw head, wherein the chamfered part at least partially extends in the axial direction along the claw part.

* * * * *